United States Patent [19]

Ledwell et al.

[11] Patent Number: 4,567,852

[45] Date of Patent: * Feb. 4, 1986

[54] CHICKEN HARVESTING MACHINE

[75] Inventors: Lloy W. Ledwell; Stephen H. Ledwell; Bobby W. Nolte, all of Texarkana, Tex.

[73] Assignee: Ledwell & Sons Enterprises, Inc., Texarkana, Tex.

[ * ] Notice: The portion of the term of this patent subsequent to Aug. 28, 2001 has been disclaimed.

[21] Appl. No.: 644,216

[22] Filed: Aug. 24, 1984

Related U.S. Application Data

[63] Continuation of Ser. No. 511,874, Jul. 8, 1983, Pat. No. 4,467,745.

[51] Int. Cl.[4] ............................................. A01K 29/00
[52] U.S. Cl. ...................................................... 119/82
[58] Field of Search ............................................ 119/82

[56] References Cited

U.S. PATENT DOCUMENTS

| | | | |
|---|---|---|---|
| 3,672,335 | 6/1972 | Sanders | 119/82 |
| 3,785,349 | 1/1974 | Christopher | 119/82 |
| 4,037,565 | 7/1977 | Ledwell, Jr. | 119/82 |
| 4,301,769 | 11/1981 | Mola | 119/82 |
| 4,467,745 | 8/1984 | Ledwell et al. | 119/82 |

Primary Examiner—Hugh R. Chamblee

[57] ABSTRACT

A chicken harvesting machine which includes a wheel mounted main chassis, a chicken pickup conveyor at one end of the chassis, an elevating framework movably supporting the chicken pickup conveyor on the chassis, a discharge conveyor movably mounted on the opposite end of the chassis from the chicken pickup conveyor, and a coop positioning structure carried on the chassis in a position at which a coop supported thereon can receive chickens discharged from the discharge conveyor. The coop supporting structure is mounted on the chassis for pivotation about a horizontal axis, and includes a laterally shiftable subframe. The laterally shiftable subframe carries a reciprocable platform for moving a chicken coop into a loading attitude adjacent the discharge conveyor.

3 Claims, 14 Drawing Figures

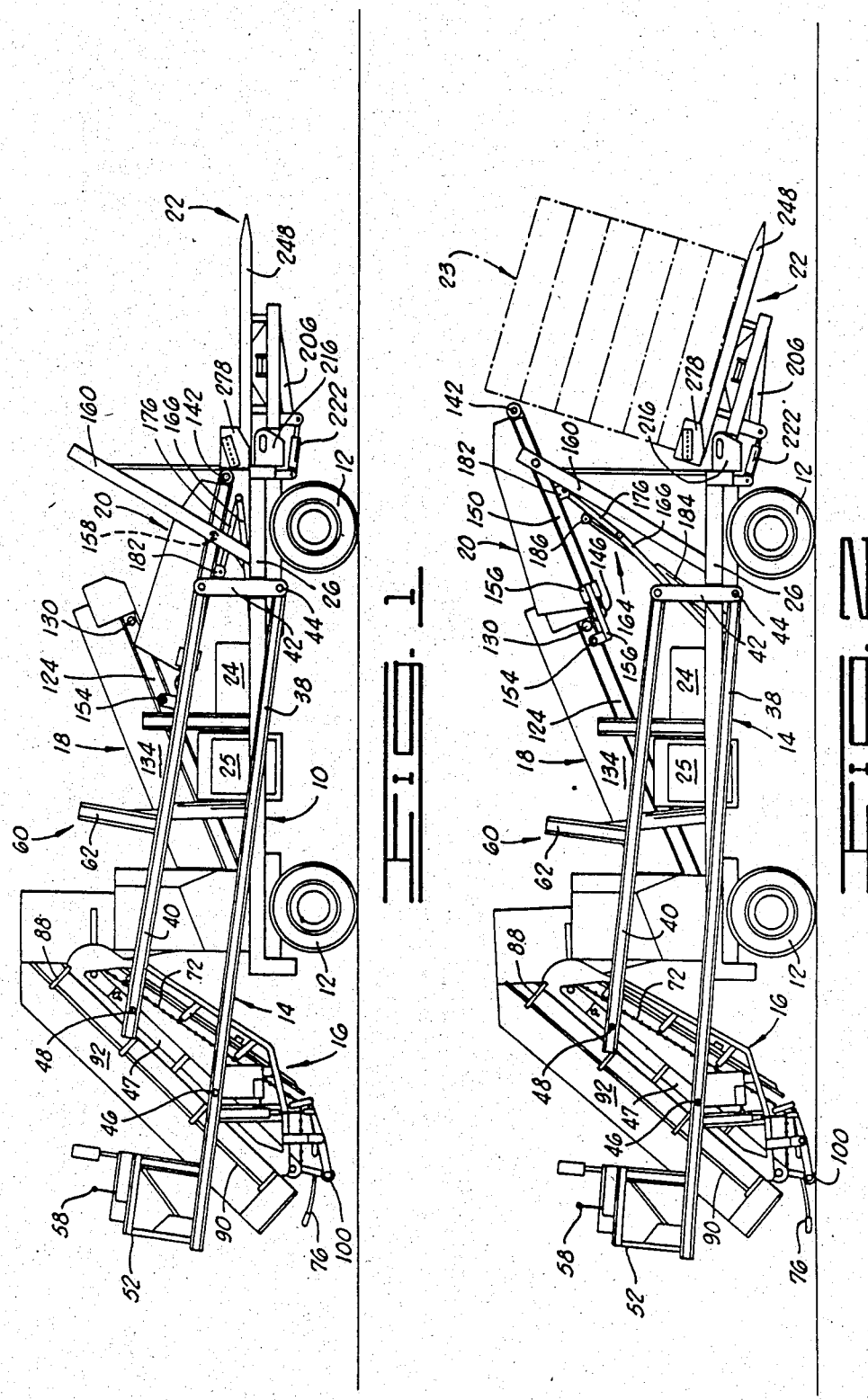

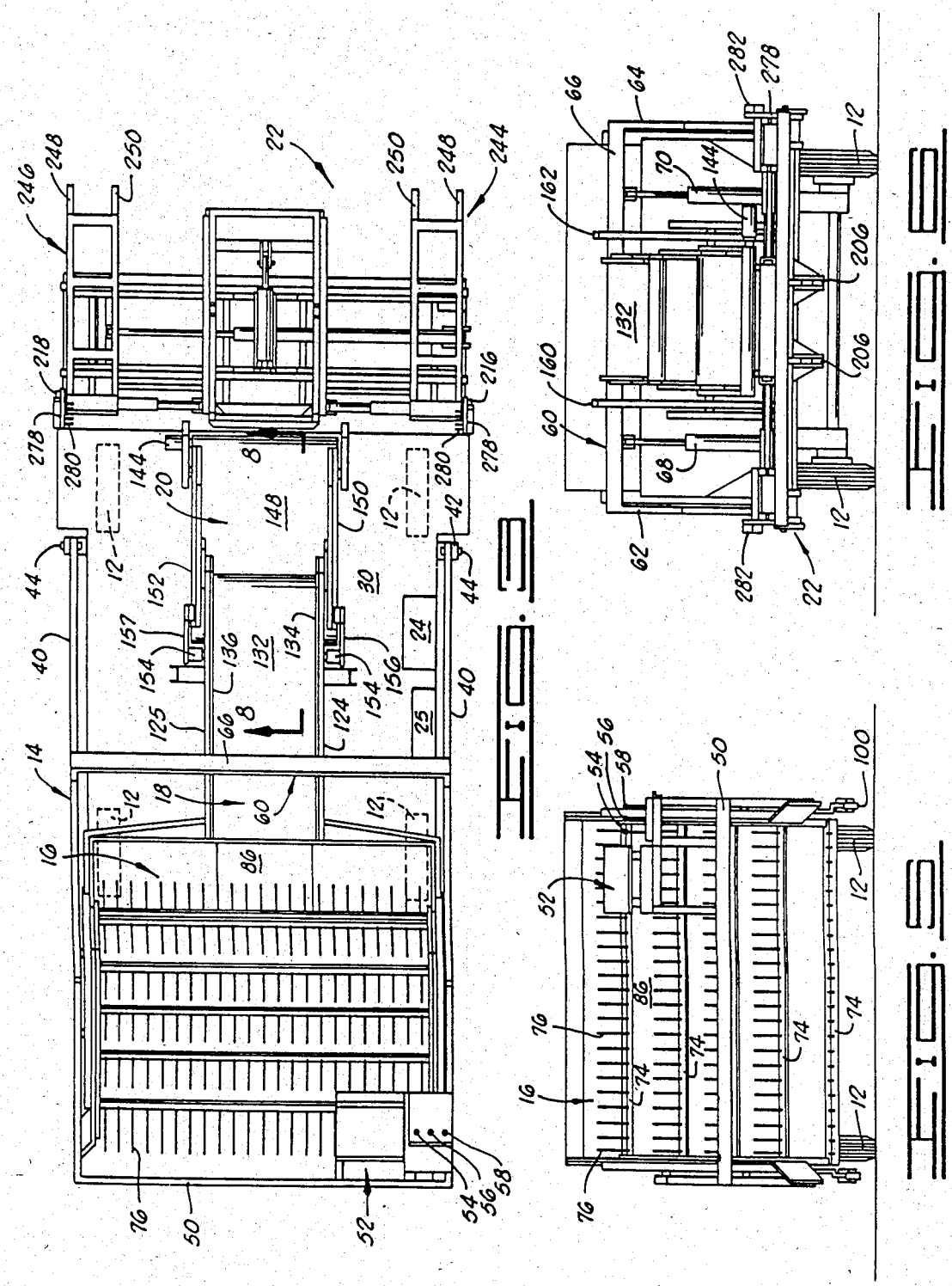

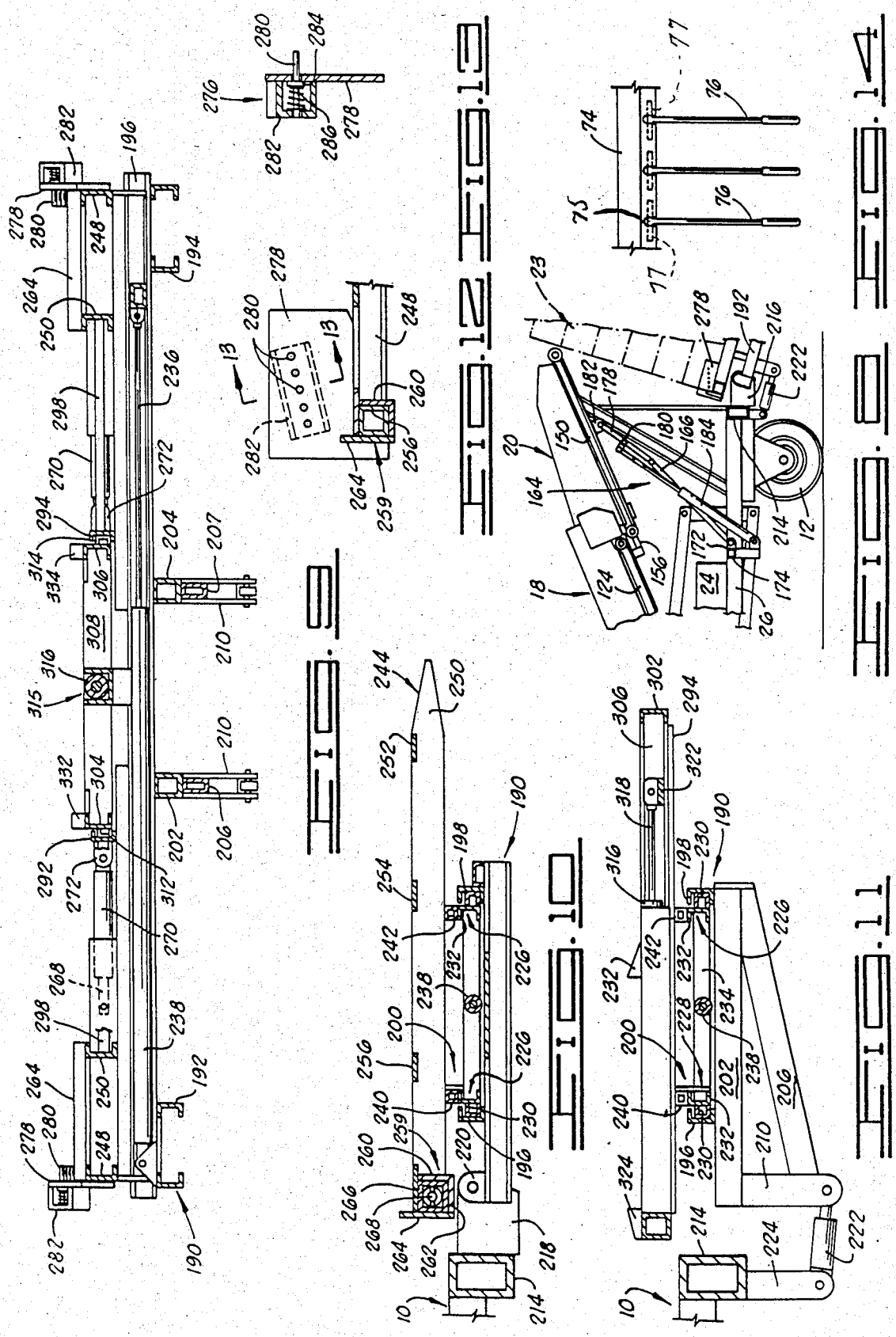

CHICKEN HARVESTING MACHINE

This is a continuation of application Ser. No. 511,874, filed July 8, 1983, now U.S. Pat. No. 4,467,745.

BACKGROUND OF THE INVENTION

1. Field of the Invention

This invention relates to a chicken harvesting apparatus of a type intended for self-propelled movement inside a large commercial chicken house in which chickens are raised, which apparatus is used for the purpose of picking up and cooping chickens for transport to a slaughtering or meat processing facility.

2. Brief Description of the Prior Art

In Ledwell U.S. Pat. No. 3,921,588, assigned to the assignee of the present invention, an apparatus and a method for harvesting domestic fowl or chickens is depicted and described. The apparatus utilized includes a chicken gathering conveyor which carries a plurality of sets of fingers moveably mounted on chains and moved through an endless path which has a lowermost portion adjacent the ground. The chickens are scooped up by the fingers of the chicken gathering conveyor, and are then moved by a series of transfer conveyors to a point of discharge into a coop or other container preparatory to moving or transporting the harvested chickens to a processing facility.

BRIEF DESCRIPTION OF THE PRESENT INVENTION

The present invention constitutes an improvement over the apparatus for harvesting chickens and other domestic fowl as depicted and described in U.S. Pat. No. 3,921,588. The principal improvement residing in the apparatus of the present invention, in relation to that which is described in the cited U.S. patent, is the capability of the present invention of quickly automatically loading a very large number chickens into a twin-tiered coop which is automatically positioned and indexed for receiving the chickens, and which is adapted for loading on the chicken harvesting apparatus and removal therefrom by the use of a special coop loading apparatus. Greater numbers of chickens can be much more easily, quickly and selectively loaded into multi-bin coops with the apparatus of the present invention than any similar device which is known.

Broadly described, the apparatus of the present invention includes a wheel mounted main chassis having independent drive means for driving and steering certain of the wheels independently of the others, thereby affording excellent maneuverability to the chicken harvesting apparatus. At the forward end of the main chassis, a chicken pickup conveyor is mounted on an elevating framework which is moveably supported on the main chassis so that the chicken pickup conveyor can be elevated to an over the road position, or lowered to a harvesting position. The chicken pickup conveyor of the present invention is somewhat similar in its general mode of operation to the multi-fingered conveyor described in the U.S. Pat. No. 3,921,588, and reference is made to that patent for a fuller and more complete understanding of the chicken pickup conveyor forming a part of the present invention.

At the rear end of the chassis, a discharge conveyor is moveably mounted on the chassis for both bodily translational and pivotal movement in a concurrent fashion, so that by such movements the end of the discharge conveyor can be registered with various bins or compartments in a two-tiered coop used for receiving the chickens discharged from the discharge conveyor. A static or stationary intermediate conveyor is mounted centrally on the chassis and functions to receive chickens from the chicken pickup conveyor and transfer them to the discharge conveyor.

At the rear end of the chassis in a position below and slightly to the rear of the discharge conveyor, a coop supporting and positioning structure is pivotally carried on the chassis for pivotation about a horizontal axis. The coop positioning structure includes a laterally shiftable subframe which, in possessing the capability of undergoing lateral or transverse shifting relative to the discharge conveyor, can align and register either of two vertical compartment tiers of a two-tier coop in alignment with the discharge conveyor. The laterally shiftable subframe forming a part of the coop supporting structure carries a reciprocable platform or framework which can be shifted forwardly or rearwardly, and which functions to receive a chicken coop loaded onto the coop supporting structure, and accurately position it in a position at the forward end of the supporting structure in a chicken receiving status.

An important object of the present invention is to provide a chicken harvesting machine which facilitates enables high speed harvesting of chickens, and automatic loading of the chickens into a two-tiered coop with precise control of the point of discharge of chickens into the coop so as to selectively load pre-determined numbers of chickens into each of a plurality of bins or compartments in each coop.

Another object of the invention is to provide a highly maneuverable chicken harvesting apparatus which can be used for picking up chickens roosting on the ground in a chicken raising facility without bruising or damaging the fowl, and for then transferring these chickens into a coop preparatory to transporting the chickens to a slaughtering facility.

A further object of the invention is to provide a chicken harvesting apparatus which is rugged in construction, and which requires little maintenance and is characterized in having a relatively long and trouble free operating life.

Additional objects and advantages of the invention will become apparent as the following detailed description of a preferred embodiment of the invention is read in conjunction with the accompanying drawings which illustrate such preferred embodiment.

BROAD DESCRIPTION OF THE DRAWINGS

FIG. 1 is a side elevation view of the apparatus of the present invention as it appears with the apparatus components placed in an over-the-road or travel position.

FIG. 2 is a side elevation view of the chicken harvesting apparatus of the invention as it appears when it is in a chicken harvesting and coop loading status. A receiving coop is illustrated in dashed lines.

FIG. 3 is a plan view of the chicken harvesting apparatus illustrated in FIG. 1.

FIG. 5 is a front elevation view of the chicken harvesting apparatus when it is in the travel or over-the-road status.

FIG. 6 is a rear elevation view of the chicken harvesting apparatus as it appears when viewed from the rear when it is in the transport or over-the-road position.

FIG. 8 is a sectional view taken along line 8—8 of FIG. 3.

FIG. 9 is a sectional view taken along line 9—9 of FIG. 7.

FIG. 10 is a sectional view taken along line 10—10 of FIG. 7.

FIG. 11 is a sectional view taken along line 11—11 of FIG. 7.

FIG. 12 is a sectional view taken along line 12—12 of FIG. 7.

FIG. 13 is a view of a finger clamping plate subassembly.

FIG. 14 is a view of pickup fingers.

DETAILED DESCRIPTION OF A PREFERRED EMBODIMENT OF THE INVENTION

Figure 4:
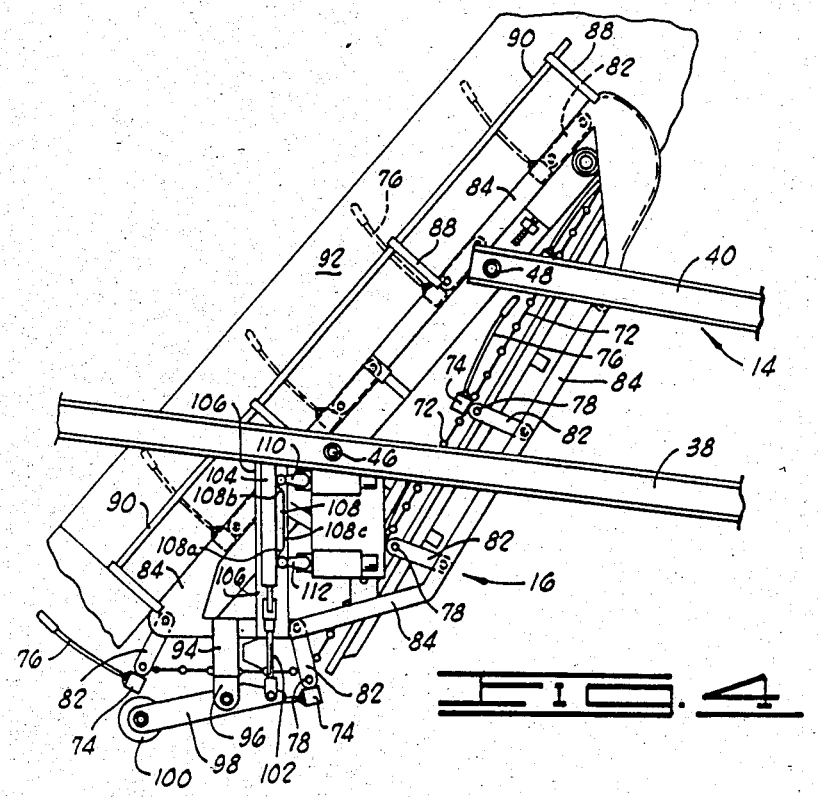
FIG. 4 is a side elevation view of the forward part of the chicken harvesting apparatus showing, particularly, the chicken pickup conveyor subassembly at the front end of the apparatus, and a portion of an elevating framework which is connected to the chicken pickup conveyor.

Referring initially to FIG. 1 of the drawings, the chicken harvesting apparatus of the invention includes a main frame or chassis 10 which is supported on four ground engaging wheels 12 to facilitate transport of the apparatus from one location to the other, and to mobilize the apparatus when it is in use for harvesting chickens. Pivotally supported on the main frame or chassis 10 is an elevating framework deginated generally by reference numeral 14. The elevating framework 14 is depicted in its elevated, over-the-road or transport position in FIG. 1, and in its lowered, chicken harvesting or operational position in FIG. 2.

Supported on the elevating framework 14 at the forward end of the chicken harvesting apparatus is a chicken pickup conveyor subassembly designated generally by reference numeral 16. A stationary intermediate conveyor subassembly is mounted centrally on the main chassis 10, and is designated generally by reference numeral 18. Near the rear end of the main chassis 10, a discharge conveyor subassembly, designated generally by reference numeral 20, is supported on the chassis for simultaneous translational and pivotal movement in a manner, and for a purpose, hereinafter described.

A coop supporting structure, designated generally by reference numeral 22, is pivotally mounted across the rear of the main chassis for pivotation about a horizontal axis. In FIG. 2, a two-tiered, multiple bin coop 23 is shown in phantom lines as it appears when supported on the coop supporting structure 22, and in the attitude or status it assumes when chickens are to be loaded into the two-tiered coop from the discharge conveyor subassembly 20.

A prime mover 24 providing a power source for driving the chicken harvesting apparatus is mounted centrally on the main chassis 10, as is a radiator 25 for ventilating and cooling the heat exchange medium used in the prime mover.

Having described the major components and major subassemblies of the chicken harvesting apparatus, reference will now be made in greater detail to the various structural elements which make up the several subassemblies. The main frame or chassis 10 includes a pair of horizontally extending parallel side frame members 26 which are interconnected in a generally rectangular frame by a transversely extending horizontal frame members (not visible). A deck plate 30 covers the upper side of the main frame as shown in FIG. 3.

The elevating framework 14 includes pairs of forwardly extending lateral or side frame members 38 and 40 disposed on opposite sides of the main chassis 10. The lateral or side frame members 38 and 40 (within each pair) of the elevating framework 14 are interconnected at their rear ends by a pivot link 42, and the elevating framework is pivotally attached to the main chassis by a suitable pivot shaft 44 which connects the rear end of the lateral frame members 38 to the chassis at the location shown in FIGS. 1 and 2.

Near the forward ends of the lateral or side frame members 38 and 40 in each pair of these frame members, each side frame member 38 is connected through a pivot shaft 46 to one of two frame elements 47 of the chicken pickup conveyor subassembly 16, and located in parallel relation at the opposite sides thereof. Each upper lateral frame member 40 is also connected to one of such side frame elements 47 of the chicken pickup subassembly by a pivot shaft 48. At their forward ends, the two lower lateral frame members 38 are interconnected across the front of the chicken harvesting apparatus by a transversely extending frame member 50, as best illustrated in FIG. 5. An operator's control seat 52 is mounted at the forward end of the elevating framework 14 as illustrated in FIGS. 1, 2 and 5. Control levers 54, 56 and 58 are positioned adjacent the operator's seat 52 to facilitate raising and lowering the elevating framework 14 by a hydraulic control system, for hydraulically driving the hereinafter described endless chains forming a part of the chicken pickup conveyor subassembly 16, for hydraulically operating and shifting the rear conveyor subassembly 20, and for hydraulically powering the wheels 12.

In order to elevate the elevating framework 14, and with it the chicken pickup conveyor subassembly 16 carried on the forward end thereof, a generally U-shaped connecting subframe, designated generally by reference numeral 60, extends across the main chassis 10 at a location above the uppermost lateral frame members 40, and is welded or otherwise suitably secured thereto to form a part of the elevating framework. The U-shaped connecting subframe 60 includes, as illustrated in FIG. 6, a pair of vertically extending legs 62 and 64 and a cross beam 66. A pair of hydraulic piston and cylinder assemblies 68 and 70 are positioned between the side frame members 26 of the chassis 10 and the cross beam 66. The free end of the piston rod in each of these piston and cylinder assemblies 68 and 70 is pivotally connected to the cross beam 66, and the base of each of the cylinders in these piston and cylinder assemblies is pivotally connected to a respective one of the side frame members 26 of the chassis 10.

The chicken pickup conveyor subassembly 16 is constructed generally similarly to that which is illustrated in U.S. Pat. No. 3,921,588. The chicken pickup conveyor subassembly 16 thus includes a pair of horizontally spaced endless, sprocket driven chains 72 which carries a plurality of transversely extending hollow finger support bars 74 at spaced intervals along the chain. Each finger support bar 74 carries, at longitudinally spaced intervals therealong, a plurality of slightly curved pickup fingers 76. Each pickup finger 76 is mounted to its respective support bar 74 by extending the rod-like finger through a slot 75 in the bar which has a length greater than the thickness of the finger, and securing the inner end of the finger to a T-head element 77 inside the bar as shown in FIG. 14. The chains 72 are passed over a drive sprocket and an idler sprocket (not shown) mounted at opposite ends of the frame elements 47 disposed on opposite sides of the pickup conveyor 16.

As described in U.S. Pat. No. 3,921,588, each of the support bars 74 carries pivot pins 78 at its opposite ends. The pivot pins 78 secured to opposite ends of each support bar 74 extend through journal loops or eyes welded to one side of the respective endless chains 72 and are free to pivot in such eyes. At its outer end on the opposite side of the respective sprocket chain from its associated support bar 74, each pivot pin 78 is secured to one end of a pivot arm 82. At its end opposite that which is secured to the respective pivot pin 78 each pivot arm 82 has a tracking roller (not shown) journaled thereon. The tracking rollers of the several pivot arms 82 extend into a channel track 84 which is bent through a generally circuitous or closed path with bend angles located at critical points in the manner described in U.s. Pat. No. 3,921,588.

The described mounting of the support bars 74 and of the pickup fingers 76 which each of such bar carries assures that, as the endless sprocket chains 72 are driven by engagement with a drive sprocket, the chicken pickup fingers will be caused to undergo the movements which are described in U.S. Pat. No. 3,921,588. Thus, when the chicken harvesting apparatus is in the operative or harvesting position, as shown in FIG. 2, the pickup fingers 76 are brought into a position very close; and extending substantially parallel, to the ground. The movement of these fingers 76 into this position, coupled with the forward movement of the harvesting apparatus, enables the pickup fingers 76 to be gently extended under chickens roosting on the ground, followed by the slow and gentle lifting of these chickens onto the rearwardly running upper course of the chicken pickup conveyor subassembly.

A flat sheet or plate 86 is extended across the chicken pickup conveyor subassembly at a location between runs of the endless chains 72 on opposite sides of the conveyor, and at a level which is substantially aligned with the uppermost parts of the closed course formed by the channel tracks 84. Secured to the outer side of these portions of the track 84 are a plurality of fence plate supporting posts 88 which project upwardly from the tracks 84 and are used to support a longitudinally extending fence plate support member 90. The fence plate support posts 88 and support member 90 support vertically extending fence plates 92 disposed at opposite sides of the plate 86 and outside of the courses of movement followed by the outermost of the pickup fingers 76 during their upward movement during the chicken harvesting operation.

Further details as to the construction and operation of the chicken pickup conveyor subassembly 16 can be had by referring to U.S. Pat. No. 3,921,588, which patent, in its pertinent and relevant teachings, is incorporated herein by reference.

At the lowermost portion, and near the forward end of, each of the channel tracks 84, a downwardly extending pivot post 94 is welded to the outer side of the channel forming the respective channel track, and carries at its lower end, a clevis bracket 96. A sensing arm 98 is pivotally connected to the clevis bracket 96 and carries at its forward end, a small sensing wheel or sensing roller 100. At its end on the opposite side of the clevis bracket 96 from that end upon which the sensing wheel or roller 100 is located, the sensing arm 98 is pivotally connected to a control link 102 which is connected at its upper end to a cam bar 104. The cam bar 104 is slidably mounted upon a slide plate 106 for vertical reciprocation and carries a double cam element 108 on the rear side thereof.

The double cam element 108 has a pair of inclined cam surfaces 108a and 108b located on opposite sides of a straight vertical surface 108c. A pair of spring biased switch contact elments 110 and 112 are positioned in the path of the cam surfaces 108a and 108b. The switch contact element 112, upon encountering the cam surface 108a, is biased inwardly to close a control switch (not shown). Such action will occur at such time as the sensing wheels 110 at opposite sides of the chicken pickup conveyor subassembly 16 encounter a hump or high point in the ground as the harvesting apparatus is driven forward. When the sensing wheels 100 on opposite sides of the chicken pickup conveyor subassembly 16 encounter a depression in the ground as the chicken harvesting apparatus moves forward, the effect is to cause the control link 102 and cam bar 104 to move upwardly, thus causing the spring biased switch contact element 110 to ride over the inclined cam surface 108b, thus opening a second control switch (not shown). These control and sensing systems, located at opposite sides of the chicken pickup conveyor subassembly 16, provide electrical signals in response to movements of the sensing rollers 100 over the ground. Such signals, developed upon closure of the control switches in appropriate circuits, function to adjust the elevation of the elevating framework 14 and the chicken pickup conveyor subassembly 16 carried thereon in order to keep the pickup fingers 76 at a level which is just above the upper surface of the ground.

The control system which is utilized for this purpose develops a hydraulic response to the closure of one of the control switches as one of the contact elements 110 or 112 of these switches rides over the inclined cam surfaces 108a or 108b of the double cam element 108, thus providing hydraulic power to the cylinders included in the piston and cylinder assemblies 68 and 70.

As previously indicated, the intermediate conveyor subassembly 18 is stationary with respect to the chassis 10, and is mounted substantially centrally thereon. The stationary intermediate conveyor subassembly 18 performs the function of receiving chickens from the chicken pickup conveyor subassembly 16, and moving them upwardly and rearwardly to a point of discharge onto the discharge conveyor subassembly 20. The stationary intermediate conveyor subassembly 18 includes a pair of lateral, horizontally spaced channels 124 and 125 which extend upwardly from the forward end of the conveyor assembly 18 toward the rear end thereof and are supported by suitable support elements (not shown) on the main frame or chassis 10.

Extending between the aligned upper ends of the lateral, horizontally spaced channels 124 and 125 is an idler roller (not visible) which is mounted for rotation upon a shaft 130 having its opposite ends journaled in the lateral, horizontally spaced channels. A drive roller (not visible) is similarly mounted between the lower ends of the lateral, horizontally spaced channels 124 and 125 and functions to drivingly engage an endless belt 132 which forms the conveying surface of the stationary intermediate conveyor subassembly 18. While chickens are moving upwardly on the endless belt 132 of the intermediate stationary conveyor subassembly 18, they are laterally confined by a pair of vertically extending confinement plates 134 and 136 which have their lower edges secured to the inner sides of the lateral, horizontally spaced channels 124 and 125.

As illustrated in FIGS. 1 and 2 of the drawings, each of the lateral, horizontally spaced channels 124 opens outwardly so as to form a trackway extending longitudinally along the opposite sides of the stationary intermediate conveyor subassembly 18. These trackways act as guides which guide the retractional and elevational movement of the discharge conveyor subassembly 20 as hereinafter explained.

An important structural sumcombination of the present invention is the discharge conveyor subassembly 20. The discharge conveyor subassembly 20, during utilization of the chicken harvesting apparatus, is moved between its over-the-road, lowered position illustrated in FIG. 1 and its operative, chicken discharging position illustrated in FIG. 2 of the drawings. The discharge conveyor subassembly 20 includes a driven belt roller 142 located on its upper end and rotatably powered by a hydraulic motor 144. At the lower end of the discharge conveyor, an idler belt roller 146, is located and functions cooperatively with the driven roller 142 to support an endless belt 148. The shafts which carry the driven belt roller 142 and the idler belt roller 146 are journaled at their opposite ends in a pair of lateral, horizontally spaced channel elements 150 and 152.

To facilitate positioning of the discharge conveyor subassembly 20 by an elevating and retracting mechanism hereinafter described, the discharge conveyor has a pair of forward tracking rollers 154 mounted at its forward opposite sides by means of a pair of supporting brackets 156 and 157 which are welded or otherwise suitably secured to the outer side of the respective lateral, horizontally spaced channel elements 150 or 152. The forward tracking rollers 154 are sized and positioned to permit them to roll along, and guide upon, the lateral, horizontally spaced, outwardly opening channels 124 and 125 of the stationary intermediate conveyor subassembly 18.

To further facilitate the concurrent translational and pivotal movement of the discharge conveyor subassembly 20 which permits it to be moved downwardly and forwardly, or to be moved upwardly and rearwardly, a pair of rear tracking rollers 158 are secured to, and project outwardly from, the lateral, horizontally spaced channel elements 150 and 152. The rear tracking rollers 158 rollingly engage a pair of vertically projecting channel tracks 160 and 162 which are secured at their lower ends to the main chassis 10 and project upwardly therefrom with a slight rearward inclination as shown in FIGS. 1 and 2.

It will be perceived that the manner in which the forward tracking rollers 154 and the rear tracking rollers 158 are mounted and cooperate with the lateral, horizontally spaced channels 124 and 125 of the intermediate, stationary conveyor subassembly 18, and with the vertically projecting channel tracks 160 and 162, respectively, permits the discharge conveyor 20 to concurrently undergo a translational and pivotal movement so that it can be moved forwardly and pivoted downwardly from the position shown in FIG. 2 of the drawings (its operational, chicken harvesting position) to the lowered and retracted position shown in FIG. 1 (its inoperative, over-the-road position).

In order to provide the mechanism by which the discharge conveyor subassembly 20 is moved in the manner described, a hydraulically powered scissors-linkage or mechanism, designated generally by reference numeral 164, is provided and is positioned between the main frame or chassis 10 and the discharge conveyor 20. The hydraulically powered scissors-linkage or mechanism 164 includes a pair of horizontally spaced, lower elevator arms 166, each of which has its lower end pivotally connected to pivot bracket elements 170 secured to a crossbeam 174 forming a part of the main frame or chassis 10. The upper, rearward end of each of the lower elevator arms 166 is pivotally connected to the lower end of a respective one of two horizontally spaced upper elevator arms 178. A push bar 180 extends horizontally between, and is connected to, intermediate points on the two upper elevator arms 178.

At its upper end, each of the upper elevator arms is pivotally connected to a connection plate 182. The connection plates are secured to, and depend from, the lower side of the lateral, horizontally spaced channel elements 150 and 152 located at opposite sides of, and forming elements within, the discharge conveyor subassembly 20. A hydraulic piston and cylinder subassembly 184 is located between the chassis 10 and the push bar 180 with the cylinder base pivotally connected to the chassis. The upper, free end of the piston rod of the piston and cylinder subassembly 184 is pivotally connected to a pair of connecting ears 186 which are welded to the central portion of the push bar 180. When the piston rod of the piston and cylinder subassembly 184 is extended, the hydraulically powered scissors mechanism 164 is also scissored out to force the discharge conveyor subassembly upwardly and rearwardly from the position illustrated in FIG. 1 to the position illustrated in FIG. 2.

One of the principal purposes of moving the discharge conveyor subassembly 20 upwardly and rearwardly from the position shown in FIG. 1 to the position shown in FIG. 2, and then, during operation of the chicken harvesting apparatus, reversing this movement in a much slower motion, is to permit the rear end or discharge point of the discharge conveyor subassembly to precisely track the forward side of a two-tiered, multi-bin receiving coop 23 of the sort illustrated in dashed lines in FIG. 2. The coop 23 has previously been oriented into this chicken receiving position by means of the coop supporting structure 22 carried at the rear of the harvesting apparatus, and illustrated in two of its possible positions in FIGS. 1 and 2. The coop supporting structure 22 constitutes a very important subassembly or structural arrangement included within the harvesting apparatus of the present invention, since, in cooperation with the discharge conveyor subassembly 20, it facilitates precise control of the loading of predetermined numbers of chickens into each of the several bins or compartments which are provided in a coop structure which is selectively and precisely positioned by the coop supporting structure during operation of the apparatus.

Figure 7:
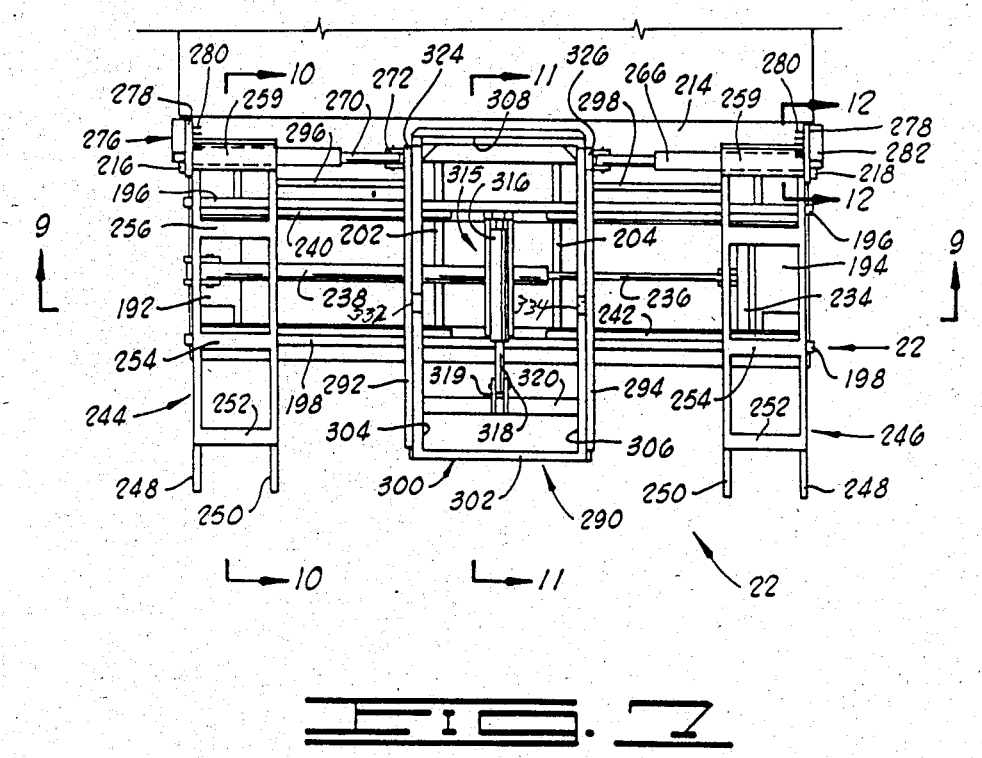
FIG. 7 is an enlarged plan view of the coop supporting structure which is pivotally supported on the rear of the main chassis of the chicken harvesting apparatus.

The coop supporting structure 22 is broadly shown in FIGS. 1 and 3, and is illustrated in detail in FIGS. 7–10. This structure includes a main subframe 190 which is made up of a pair of downwardly opening, horizontally spaced end channel elements 192 and 194. The horizontally spaced, downwardly opening end channel elements 192 and 194 are interconnected by a pair of parallel, horizontally spaced, transverse channel elements 196 and 198 which have their open sides facing each other as illustrated in FIGS. 9 and 10. The transverse channel elements 196 and 198 function as tracks to facilitate and guide movement of a laterally shiftable transverse subframe, designated generally by reference numeral 200, which is reciprocably mounted on the main subframe 190 in a way, and for a purpose hereinafter described. The transverse channel elements 196 and 198 are further supported by, and secured to the upper side of, a pair of central frame elements 202 and 204 as illustrated in FIGS. 7, 9 and 11. Diagonal brace members 206 and 207 extend from the rear lower side of each of the central frame elements 202 and 204 downwardly and forwardly to a point where each is connected to a downwardly projecting pivot bracket 210 (see FIGS. 9 and 11).

The main chassis 10 includes a large box beam-type, transversely extending, mounting bar 214 which is secured across the rear end of, and forms a part of, the main chassis 10. The mounting bar 214 includes attachment plates 216 and 218 secured to the ends of the mounting bar on opposite sides of the chassis 10 to facilitate pivotal mounting of the coop supporting structure 22 on the chassis. For this purpose, the end channel elements 192 and 194 each carries a large ear 220 which is pivotally connected to the attachment plates 216 and 218 so that the coop supporting structure 22 can be swung upwardly or downwardly about a horizontal pivotal axis between the positions illustrated in FIG. 1 and FIG. 2 of the drawings.

Pivotation of the main subframe 190 about a horizontal pivotal axis is produced by a pair of hydraulic piston and cylinder assemblies 222 which extend between the downwardly projecting pivot arms 210 and a pair of downwardly projecting pivot posts 224 which are secured to the lower side of the mounting bar 214 as illustrated in FIG. 10.

The laterally shiftable transverse subframe 200, which is mounted upon the main subframe 190 for side-to-side movement thereupon includes a pair of parallel transversely extending runner subassemblies designated generally by reference numerals 226 and 228. The runner assemblies 226 and 228 cooperate with the parallel, horizontally spaced, transverse channel elements 196 and 198 of the main subframe 190 to facilitate movement of the laterally shiftable transverse subframe 200 on the main frame. Thus, each transversely extending runner subassembly 226 and 228 includes runners 230 which are slidably mounted in the transverse channel elements 196 and 198, and which are secured to support channels 232. Near one end of the laterally shiftable transverse subframe 200, a tie bar 234 extends between the support channels 232 and provides a point for connection of the laterally shiftable transverse subframe to a piston rod 236 which can be extended from or retracted within a cylinder 238 (see FIG. 7) at a time and for a purpose hereinafter described. The cylinder 238 is pivotally connected to a clevis 239 which is welded to the channel element 192 of the main subframe 190.

Mounted on the upper flange of the support channels 232 are a pair of tubular elements 240 and 242 which extend along the laterally shiftable transverse subframe 200 and function to support a pair of coop supporting substructures designated generally by reference numerals 244 and 246. Each of the coop supporting substructures 244 and 246 includes a pair of horizontally spaced, longitudinally extending, substantially parallel plate beams 248 and 250 which are tapered to a relatively blunt point at their rearward ends as shown FIG. 10. The two plate beams 248 and 250 in each of the coop supporting substructures are interconnected by a plurality of transverse support elements 252, 254, and 256. An external sleeve 259 extends across a forward side of each of the coop supporting substructures 244 and 246 and, as shown in FIG. 10, is made up of a first, downwardly extending sleeve plate 260 which is secured at its lower edge to a horizontally extending, external sleeve plate 262. The forward side of each external sleeve 259 is formed by a vertically extending sleeve plate 264 which, as illustrated in FIG. 10, projects above the upper surface of the plate beams 248 and 250 to form a stop limiting the forward motion or movement of a coop supported on the coop supporting substructures in a manner hereinafter described.

A rectangularly cross-sectioned internal sleeve 266 is slidably positioned within the external sleeve 258, and is connected to a piston rod 268 which is extendable from a cylinder 270 which has its end opposite the piston rod 268 pivotally pinned to a clevis bracket 272. The end of each internal sleeve 266 which is opposite the end into which the cylinder 270 extends is connected to a multiple finger confining plate subassembly 276. These multiple finger confining plate subassemblies 276 can be shifted laterally outwardly when the piston rods 268 are extended from the cylinders 270 to permit a coop to be placed therebetween, and then the confining plate subassemblies can be drawn toward each other by retraction of the piston rods. The purpose of this manipulation of the multiple finger confining plate subassemblies will be hereinafter described.

Each of the multiple finger confining plate subassemblies 276 includes a vertically extending lateral abutment plate 278 which has a plurality of retractable coop engaging fingers 280 extending slidably therethrough, and arranged along a line which is inclined to the plane of the upper side of the laterally shiftable transverse framework 200. Each coop engaging finger 280 is an elongated shaft which projects through a hole in the abutment plate and into a finger housing 282 positioned on the laterally outer side of the abutment plate. Each of the fingers 280 carries a spring collar 284 secured around the respective finger and located within the finger housing 282. Each spring collar 284 acts as a spring abutment element for a compression spring 286 which surrounds the respective coop engaging finger 280 and abuts the outer side of the finger housing as shown in FIG. 11. It will thus be perceived that the springs 286 resist retraction of the respective coop engaging fingers 280 into the finger housing 282 when a pressure is exerted on the inner end of any one of the fingers tending to push it outwardly against the resilient bias of the respective spring.

Centrally mounted on the laterally shiftable transverse subframe 200 is a reciprocating coop forwarding subassembly, designated generally by reference numeral 290. The reciprocating coop forwarding subassembly includes a pair of channel tracks 292 and 294 which are secured to and across the tubular elements 240 and 242. Bracing elements 296 and 298 extend between the outer sides of the channel tracks 292 and 294 and the facing sides of the plate beams 250 in the two coop supporting substructures 244 and 246. A reciprocable framework 300 is slidably mounted in the channel tracks 292 and 294 and includes a rear frame element 302, a pair of opposed, substantially parallel side frame elements 304 and 306 and a forward frame element 308. The side frame elements 304 and 306 carry runners 312 and 314, respectively, as shown in FIG. 8, which runners ride in, and track upon, the channel tracks 292 and 294. For the purpose of causing fore-and-aft reciprocation of the reciprocating framework 300, a piston and cylinder assembly 315 is employed, with the cylinder 316 being connected at its base to one of the support channels 232 forming a part of the laterally shiftable transverse subframe 200. The piston rod 318 is connected to a clevis 319 welded to a cross bar 320 which extends between the side frame elements 304 and 306 of the reciprocating framework 300.

Two retractable coop latches 324 and 326 are moveably and retractably disposed in the forward ends of the side frame elements 304 and 306 of the reciprocating framework 300 and are biased to an upward position, in each case, by springs (not shown). A pair of stationary, upwardly projecting coop stop elements 332 and 334 are located intermediate the length of each of the side frame elements 304 and 306 as shown in FIGS. 7, 9, and 11.

OPERATION

In the operation of the chicken-harvesting apparatus of the invention, the self-propelled apparatus is first placed in an over-the-road or transport position. This status of the apparatus is illustrated in FIG. 1 of the drawings. For moving to a location where the chickens are to be harvested, the elevating framework 14 is elevated to lift the chicken pick-up conveyor subassembly to a position spaced above a roadway traversed by the apparatus. The discharge conveyor subassembly 20 is lowered to the position shown in FIG. 1 by retracting the piston of the hydraulic piston in cylinder subassembly 184 to cause the scissors linkage or mechanism 164 to be collapsed so that the upper elevator arms 176 lie along and closely adjacent the lower elevator arms 166 and 168.

When the harvesting apparatus has been brought to the location where the chickens are to be harvested, usually within a large enclosed chicken-raising house where the chickens are roosting upon the ground inside the house, the apparatus is driven through a large bay at one end of the house and the chicken harvesting is commenced. The chicken pickup conveyor subassembly 16 is lowered to a position such that the pickup fingers 76 will pass just above the surface of the ground, and in a substantially horizontally extending position when the sprocket-driven chains 72 are caused to move in a circuitous path by energization of drive sprockets engaging these chains. To lower the chicken pickup conveyor subassembly 16 to this position, the hydraulic piston and cylinder subassemblies 68 and 70 are energized to retract the pistons thereof into the cylinders and thereby lower the U-shaped connecting subframe 60 which, in turn, lowers the elevating framework 14 to which it is connected.

With the chicken pickup conveyor subassembly 16 lowered to the position described, the endless sprocket-driven chains 72 are started by rotating the drive sprockets engaging these chains. This causes the pivot arms 82, and the rollers carried thereon within the channel tracks 84, to be moved and, as the rollers on the pivot arms 82 moving in the channel tracks 84 follow the channel track, the pivot arms are pivoted so that the pickup fingers 76 undergo the type of movement described in my U.S. Pat. No. 3,921,588. In this manner, chickens are picked up by the fingers and moved gently up the incline of the chicken pickup conveyor subassembly 16 to the top thereof.

During this picking up of chickens by the chicken pickup conveyor subassembly 16, the self-propelled harvesting apparatus is being moved generally forwardly. It should be pointed out that individual control is provided for each of the ground-engaging wheels 12 of the apparatus so that the apparatus is highly mobile and can be controlled by direct lateral or forward movement, or any combination of the two during the harvesting operation.

If the ground upon which the chickens are roosting should be uneven, this will be sensed by the sensing rollers 100 as the apparatus moves forwardly. If the sensing rollers 100 encounter a ridge or hump across the ground in front of the apparatus, the rollers are moved upwardly and this, in turn, causes the rear end of the control of the sensing arms 98 upon which they are mounted to move downwardly as a result of pivotation of these arms. Downward movement of the sensing arms 98 will cause the cam bars 104 to move downwardly on the slide plates 106. The cam element 108 carrying inclined cam surfaces 108a and 108b will therefore be moved relative to each of the spring-biased switch contact elements 110 and 112. As the cam element 108 moves downwardly, the inclined cam surface 108a will contact the spring-biased switch contact element 112, causing this contact element to be forced rearwardly. This will close a circuit which will cause the hydraulic piston and cylinder assemblies 68 and 70 to be actuated to extend the piston rods, thereby slightly elevating the chicken pickup conveyor subassembly 16 to accommodate it to the hump or ridge which is being traversed by the apparatus at that time.

The reverse action will occur at at time when the sensing rollers 100 drop down into a depression or trench as a result of the cam element 108 and the inclined cam surfaces 108a and 108b carried thereby moving in the opposite direction, i.e., in a vertical direction so that the switch 110 is caused to be biased rearwardly as it moves across the inclined cam surface 108b.

Chickens reaching the top of the chicken pick-up conveyor subassembly 16 are channeled by the flow plates 91 and 93 onto the lower end of the stationary intermediate conveyor 18. On this conveyor, the chickens are moved rearwardly by the endless belt 132 forming a part of this conveyor. The chickens are prevented from falling or moving off of the stationary intermediate conveyor 18 by the pair of vertically extending confinement plates 134 and 136.

At the time that the harvesting apparatus has been moved into the chicken house, and the harvesting operation commenced, the discharge conveyor subassembly 20 has been elevated and concurrently shifted rearwardly to assume its operational position shown in FIG. 2 of the drawings. This movement of the discharge conveyor subassembly 20 is effected by extending the piston of the hydraulic piston and cylinder subassembly 184 so that the push bar 180 receives the rearwardly and upwardly directed force of the extending piston. The force applied to the push bar 180 is transferred to the upper elevator arms 176 to cause these arms to pivot apart from the lower elevator arms 166 and thereby open the scissors-linkage or mechanism 164. As the upper elevator arms 176 push upwardly on the horizontally spaced channel elements 150 and 152 of the discharge conveyor subassembly, these channel elements are moved upwardly and rearwardly due to their fixation to the upper elevator arms. This movement can be accommodated, and can be guided with precision, as a result of the tracking of the forward tracking rollers 154 in the lateral, horizontally spaced channels 124 and 125 of the stationary intermediate conveyor 18, and the tracking and guiding of the rear tracking rollers 158 in the vertically projecting channel tracks 160 and 162.

It will be perceived in referring to FIG. 2 that movement of the discharge conveyor subassembly 20 to the operational position results in the extreme rear end of the discharge conveyor from which chickens are to be discharged being moved upwardly and rearwardly. This movement places the discharge conveyor subassembly 20 in a precisely correct position for discharging chickens into a multiple bin coop of the sort shown at 23 in FIG. 2.

For the purpose of placing a coop 23 in a chicken-receiving position to receive chickens from the discharge conveyor subassembly 20, the coop is first loaded by means of a special coop-loading apparatus of the type shown in copending U.S. patent application Ser. No. 426,731 filed Sept. 29, 1982 now U.S. Pat. No. 4,474,495 assigned to the assignee of the present application. The multiple bin coop 23 is a structure which is of right parallel piped configuration, and preferably has a pair of side-by-side, vertically extending tiers of bins or compartments. Each bin or compartment is adapted to receive a certain number of chickens in for transport to a slaughter house or processing facility. The coop 23 is initially loaded upon the coop-supporting structure 22 where it is shown resting in FIG. 2. In loading the coop onto the coop-supporting structure 22, it is first lowered gently onto the reciprocating coop-forwarding subassembly 290 forming a part of the coop-supporting structure 22. The reciprocating coop-forwarding subassembly 290 is mounted for fore and aft reciprocation upon the laterally shiftable transfer subframe 200 which, in turn, is mounted for lateral or side-by-side reciprocating movement upon the main subframe 190.

Prior to placement of the coop on the reciprocating coop-forwarding subassembly, the reciprocating framework 300 has been moved to its rearwardmost position by extending the piston rod 318 from the cylinder 316 of the piston and cylinder assembly 315. When the piston rod 318 is extended, it pushes against the crossbar 320 to which it is connected by clevis 319, and this causes the reciprocating framework 300 to be moved to the rear. The reciprocating framework 300 can undergo this movement because of the slidable mounting of the side frame elements 304 and 306 and their respective runners 312 and 314 in the channel tracks 292 and 294. When the coop 23 is placed on the reciprocating framework 300 when the framework is in its rearmost position, a central transverse frame element which extends across the middle of the lower side of the coop becomes located ahead of the coop stop elements 332 and 334 which are carried on the side frame elements 304 and 306 of the reciprocating framework 300.

With the coop resting on the rearwardly positioned reciprocating framework 300, the piston rod 318 of the cylinder 316 is retracted into this cylinder to draw the reciprocating framework forwardly upon the channel tracks 292 and 294. As this forward movement is carried out, the coop stop elements 332 and 334 engage the central frame member located on the bottom side of the coop, and cause the coop to slide forwardly with the reciprocating framework and relative to the remainder of the laterally shiftable transverse subframe 200 and the main subframe 190 upon which it is supported. Stated differently, the coop is pulled forward toward the chassis or main frame 10 of the vehicle. The coop-supporting substructures 244 and 246 serve to support the side portions of the coop 23 as it is caused to slide forward by the forward movement of the reciprocating framework 300 which will then be located in the center of the coop. This forward coop movement continues until the forward side of the coop 23 encounters the vertically extending sleeve plates 264 which form stop elements located at the forward side of the external sleeves 258 carried at the extreme forward side of the coop-supporting substructures 244 and 246.

When the coop 23 has been pulled forwardly until its forward side abuts the stop elements constituted by the vertically extending sleeve plates 264, it is then clamped from the opposite sides thereof to a precisely predetermined position by means of te multiple finger clamping plate subassemblies 276. The vertically extending lateral abutment plates 278 of these assemblies are pulled inwardly toward each other by means of the retraction of the piston rods 268 into the cylinders 270. Retraction of the piston rods 268 causes the internal sleeves 266 which are connected between these piston rods and the lateral abutment plates 278 to move inwardly toward the coop.

When the lateral abutment plates 278 approach closely to the sides of the coop, one or more of the coop-engaging fingers 280 will pass through the mesh or expanded metal panels forming the sides of the coop, and others of the coop-engaging fingers will pass adjacent the front edge of the vertical frame members located at the forward lateral corners of the coop and extending in a generally vertical direction. Any fingers 280 which may encounter these frame elements can be forced into a retracted position, against the bias of the springs 286 on those particular fingers, so that, regardless of variations in the sizes of coops which are placed on the coop-supporting structure 22, the multiple finger clamping plate subassemblies 276 can accommodate themselves to any sized coop, and only those fingers which are needed for engagement of the coop will be permitted to project, while those fingers which, on their inward movement, encounter a frame element of the coop will yield outwardly and will be retracted into the finger housings 282 against the bias of the springs 286.

The multiple-bin, two-tiered coop 23 has now been positioned in its forwardmost position and has been confined laterally by the multiple finger clamping plate subassemblies 276. For the purpose of next adjusting the lateral position of the coop so that one tier of the superposed bins formed along one side of the coop will be aligned with the discharge conveyor subassembly 20, the laterally shiftable transverse subframe 200 is caused to undergo selective lateral shifting. This is accomplished by initially extending the piston rod of the piston in cylinder subassembly 222 as far as it can be extended. This causes the laterally shiftable transverse subframe 200 to be reciprocated to a position toward one side of the main subframe 190. The coop is carried with the laterally shiftable transverse subframe 200 because the reciprocating coop forwarding subassembly 290 is mounted on the laterally shiftable transverse subframe and moves with it.

When the piston 236 is fully extended, the coop is automatically positioned so that the left-hand tier of bins in the coop assembly is aligned with the endless belt 148 of the discharge conveyor subassembly 20. It will be noted that in this status, the entire main subframe 190 has been tilted downwardly at an angle with respect to the principal plane of the chassis or main frame 10. This has the advantage of having the coop 23 tilted so that chickens discharged by the discharge conveyor subassembly 20 gravitate into the respective bin which is, at that time, aligned with the discharge end of the discharge conveyor subassembly. Tilting of the coop 23 in this fashion is accomplished by retracting the piston rods within the piston and cylinder subassemblies 222 to pivot the downwardly projecting pivot post 210 forwardly, thus causing the main subframe 190 to pivot about a horizontal axis to a downwardly and rearwardly inclined position.

After the uppermost bin within the multiple bin coop 23 has been filled with the number of chickens which it is desired to place therein, the discharge conveyor subassembly 20 is shifted downwardly and forwardly slightly by actuating the piston and cylinder subassembly 184 to slightly retract the piston, thus slightly closing the hydraulically powered scissors-linkage 164. It will be noted that the vertically projecting channel tracks 160 and 162, and the lateral, horizontally spaced channels 124 and 125 of the intermediate conveyor 18 are positioned so that the forward and downward movement of the discharge end of the endless belt 148 of the discharge conveyor subassembly 20 will precisely track the inclined forward side of the multiple bin coop 23.

When the end of the endless belt 148 has become aligned with the second bin down from the top of the tier of bins at one side of the multiple bin coop 23, the piston and cylinder subassembly 184 is deactivated to halt movement of the discharge conveyor subassembly 20. The chickens can then be discharged into the second bin in the vertical tier of bins and such discharge into this bin continues until it has been filled. At this time, the discharge conveyor subassembly 20 is lowered to the next lowest bin.

This incremental and indexed downward and forward shifting movement of the discharge conveyor subassembly 20 is continued until all of the bins in one of the tiers of the multiple-bin, two-tiered coop 23 has been completed. In the example under description, this will be the left-hand tier of bins within the coop. When these bins have been filled with the desired number of chickens placed in each, then the coop is laterally shifted to bring the right tier of bins into alignment with the discharge conveyor subassembly. This is effected by retracting the piston rod 236 in the cylinder 238 to draw the laterally shiftable transverse subframe 200 toward the left, as this assembly is viewed in FIG. 7 of the drawings. Such leftward movement is continued by continued retraction of the piston rod 236 until the right-hand tier of bins in the multiple-bin, two-tiered coop 23 has become aligned with the discharge conveyor subassembly 20. The cylinder 238 is then deenergized or deactivated to stop movement of the piston rod 236. The coop is now positioned for receiving chickens discharged by the discharge conveyor subassembly 20 into the right-hand tier of bins in the coop. The movements previously described of the discharge conveyor subassembly, which has now been re-elevated to fill the bins in the right tier from the top bin downwardly, are repeated. Ultimately, all bins in the multiple bin coop 23 are filled, usually with a substantially even number of chickens, and the coop is then ready for offloading from the coop-supporting structure 22. The same type of apparatus which has previously been herein described, is then used to lift off the filled coop and load it upon a truck for transport to a processing facility.

The described operation of the chicken harvesting apparatus, here portrayed as a preferred embodiment, is a high-speed, highly efficient operation by which relatively great precision can be had in loading a specific desired number of chickens very rapidly into a multi-bin coop structure with a minimum of human intervention in doing so. Importantly, the apparatus handles the chickens without causing excessive bruising or injury, so that the flesh of the chickens thus harvested and taken to the processing facility is not devaluated by such bruising or discoloration of the flesh of the fowl. Moreover, there is relatively less trauma and shock to the chickens which, in turn, has been found to improve the condition of the poultry meat products derived from chickens harvested with the apparatus of the present invention.

Although a preferred embodiment of the invention has been herein described in order to illustrate the principles upon which the invention is based, it will be appreciated that a great many innovations and changes can be made in the precise structure which is illustrated herein without departure from the basic principles which underlie the invention. Changes and innovations of this type are therefore deemed to be within the spirit and scope of the invention, except as the same may be necessarily limited by the appended claims or reasonable equivalents thereof.

What is claimed is:

1. A system useful in harvesting and transporting chickens comprising, in operative combination:
   a multi-tiered chicken cooping module having a plurality of vertically superimposed bins therein; and
   a mobile harvester having a forward end and a rear end adapted for docking said cooping module, said mobile harvester further including:
   a chassis having a forward end, a rear end, and a pair of opposed, substantially parallel sides;
   a chicken pick-up forward conveyor mounted on the forward end of the chassis and including means for lifting and moving chickens rearwardly and upwardly to a position over the chassis;
   a stationary intermediate conveyor located centrally on the chassis and positioned between the parallel sides of the chassis to receive chickens from the chicken pick-up conveyor; and
   movable conveyor means positioned generally rearwardly on the chassis from said stationary conveyor and positioned between the sides of the chassis to be fed chickens by said stationary conveyor, said movable conveyor means including:
   a discharge conveyor horizontally aligned with said stationary conveyor; and
   means mounted on the chassis for elevating the discharge conveyor and for horizontally displacing the discharge conveyor in the direction of one of said docked cooping modules to bring chickens on said discharge conveyor into a position to gravitate into a selected one of the bins of said cooping module when said discharge conveyor is energized to rotate the discharge conveyor and move chickens thereon to a discharge end thereof.

2. A chicken harvesting apparatus for moving chickens from a point of collection within a chicken house into a cooping module having a plurality of vertically spaced bins therein, said apparatus comprising:

a chassis having a forward end and a rearward end;

means for supporting said chassis on the ground for movement of the chassis over the ground;

means for propelling said chassis along the ground;

an upwardly inclined chicken pick-up conveyor mounted to the forward end of said chassis for picking up chickens from the ground and moving sad chickens from substantially ground level upwardly and horizontally rearwardly to a location over said chassis;

intermediate conveyor means centrally located on said chassis positioned to receive chickens from said pick-up conveyor, and for moving chickens along said intermediate conveyor means in a horizontal direction in alignment with the horizontal direction chickens are moved by said chicken pick-up conveyor;

a discharge conveyor located adjacent the rearward end portion of said chassis for receiving chickens from said intermediate conveyor means, and moving said chickens rearwardly along said discharge conveyor in a horizontal direction in substantial alignment with the horizontal direction chickens are moved by said chicken pick-up conveyor, and in substantial alignment with the horizontal direction chickens are moved by said intermediate conveyor means;

means on said chassis rearward end for docking a cooping module thereto for movement with said chassis;

a multi-tiered chicken cooping module having a plurality of vertically superimposed side loading bins therein, and docked to said chassis at the rearward end thereof adjacent said discharge conveyor, and removably engaged by said docking means;

conveyor positioning means for moving said discharge conveyor vertically relative to said chassis, and to a position of registry with the uppermost bin of said cooping module for discharge of said chickens into said uppermost bin;

means for providing relative horizontal movement between said discharge conveyor and said docked cooping module during horizontal movement of said chassis, the horizontal movement of chickens on said pick-up conveyor, intermediate conveyor and discharge conveyor being in substantially a single fore-and-aft path of conveyance from the forward end of said chassis to the coop docked at the rearward end thereof, whereby minimal transverse machine space is required to accommodate the conveyance of chickens at any time during their movement to the cooping module docked at the rear of the machine; and means for automatically lowering said discharge conveyor from said position of registry with a bin of said cooping module to a position in which said discharge conveyor is located below said intermediate conveyor, and adjacent said chassis.

3. A method for harvesting chickens located in the confined space within a chicken house comprising:

approaching the chickens on the ground in the house with a chicken harvesting machine having a front end and a rear end, and moved in a horizontal direction into the chickens to thereby move the chickens onto an upwardly inclined lifting conveyor located at the forward end of the chicken harvesting machine;

moving the chicken-supporting portion of the lifting conveyor upwardly and concurrently in a horizontal direction opposite to the horizontal direction of movement of the harvesting machine to lift and convey the chickens to an elevated location over a substantially central portion of the harvesting machine;

depositing the chickens from the lifting conveyor onto a loading conveyor system aligned with said lifting conveyor in a fore-and-aft direction on said chicken harvesting machine, and extending from the lifting conveyor in the same horizontal direction as the horizontal direction in which the chicken-supporting portion of said lifting conveyor is moved to lift and convey the chickens to said previously described elevated location;

conveying the chickens horizontally on said loading conveyor system directly rearwardly away from said lifting conveyor toward a discharge end of the conveyor system, and in a horizontal direction which is opposite to the direction the chicken harvesting apparatus is moved into the chickens, and is directionally aligned with the horizontal direction in which the chicken-supporting portion of said lifting conveyor is moved;

docking to the rear end of said chicken harvesting machine, a side loading, multi-tiered coop module containing a number of vertically superimposed bins, so that said coop module is positioned adjacent the discharge end of said conveyor system toward which said chickens are being conveyed, with said module oriented in a position to receive chickens from the conveyor system into successive ones of said vertically superimposed bins;

elevating and moving horizontally toward said coop module, a portion of said loading conveyor system having chickens thereon to position the chickens on said portion of said loading conveyor system for discharge into at least one of the bins of said coop module;

periodically shifting said conveyor system relative to said coop module to load chickens therefrom into different tiers of said coop module; and wherein the horizontal movements of chickens on said lifting conveyor and on said loading conveyor system are in a single, substantially linear fore-and-aft path of conveyance from the front of said machine to said coop module docked at the rear of the machine, whereby minimal machine space width is required to accommodate the conveyance of chickens at any time during their movement to the coop module docked at the rear of the machine.

* * * * *